United States Patent
Wurtz

(10) Patent No.: US 7,668,308 B1
(45) Date of Patent: Feb. 23, 2010

(54) IN-THE-EAR HEADSET AND HEADPHONE ENHANCEMENTS

(75) Inventor: Michael J. Wurtz, Lake Oswego, OR (US)

(73) Assignee: LightSPEED Aviation, Inc., Lake Oswego, OR (US)

( * ) Notice: Subject to any disclaimer, the term of this patent is extended or adjusted under 35 U.S.C. 154(b) by 268 days.

(21) Appl. No.: 11/458,670

(22) Filed: Jul. 19, 2006

Related U.S. Application Data

(60) Provisional application No. 60/701,067, filed on Jul. 19, 2005.

(51) Int. Cl.
*H04M 1/00* (2006.01)
*H04M 9/00* (2006.01)

(52) U.S. Cl. .................................. 379/430; 455/575.2

(58) Field of Classification Search ............ 379/420.04, 379/430; 455/569.1, 575.1, 575.2; 381/66, 381/357, 370, 380
See application file for complete search history.

(56) References Cited

U.S. PATENT DOCUMENTS

| 5,298,692 | A | * | 3/1994 | Ikeda et al. | .................. 181/135 |
| 7,215,766 | B2 | * | 5/2007 | Wurtz | ........................ 379/430 |
| 2004/0136522 | A1 | * | 7/2004 | Wurtz | ........................ 379/430 |

* cited by examiner

*Primary Examiner*—Tuan D Nguyen
(74) *Attorney, Agent, or Firm*—Schwegman, Lundberg, & Woessner, P.A.

(57) ABSTRACT

Various embodiments of active headsets and/or headphones, including in-the-ear devices with boom microphones, are presented with, among other things, power-saving features, cell-phone functions, and automated activation and deactivation. Various novel methods and related circuitry are also presented.

10 Claims, 7 Drawing Sheets

IN-THE-EAR HEADSET AND HEADPHONE ENHANCEMENTS

RELATED APPLICATION

The present application claims the benefit of U.S. Provisional Application 60/701,067, which was filed on Jul. 19, 2005 and which is incorporated herein by reference.

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright© 2005, Timao Group, LLC.

BACKGROUND

Headsets are used in variety of applications to facilitate one- or two-way audio communications between users and/or devices. For example, many aircraft pilots wear headsets to enable them to communicate via two-way radio with other aircraft and air-traffic controllers as well as via a public-address system with passengers. Additionally, some headsets are worn to facilitate hands-free usage of mobile telephones, while others facilitate private listening to devices, such as computers, stereos, disk players, etc.

One problem that the present inventor recognized with conventional headsets, such as in-the-ear headsets and ANR headsets, particularly those that include boom microphones, is that one or more aspects of their power usage is inefficient. For examples, many of these headsets are inefficient in powering the boom microphone. As a consequence, the expected battery life of some of these headsets is reduced.

Accordingly, there is a need for headsets that are more efficient in their use of power.

DETAILED DESCRIPTION OF EXEMPLARY EMBODIMENT(S)

This description, which incorporates and references the Figures and incorporates the appended claims, describes one or more specific embodiments of one or more inventions. These embodiments, offered not to limit but only to exemplify and teach the invention, are shown and described in sufficient detail to enable those skilled in the art to implement or practice the invention. Thus, where appropriate to avoid obscuring the invention, the description may omit certain information known to those of skill in the art. Note that the features of various embodiments may be combined with features of other embodiments to yield other embodiments not expressly delineated as such.

Figure 1A:
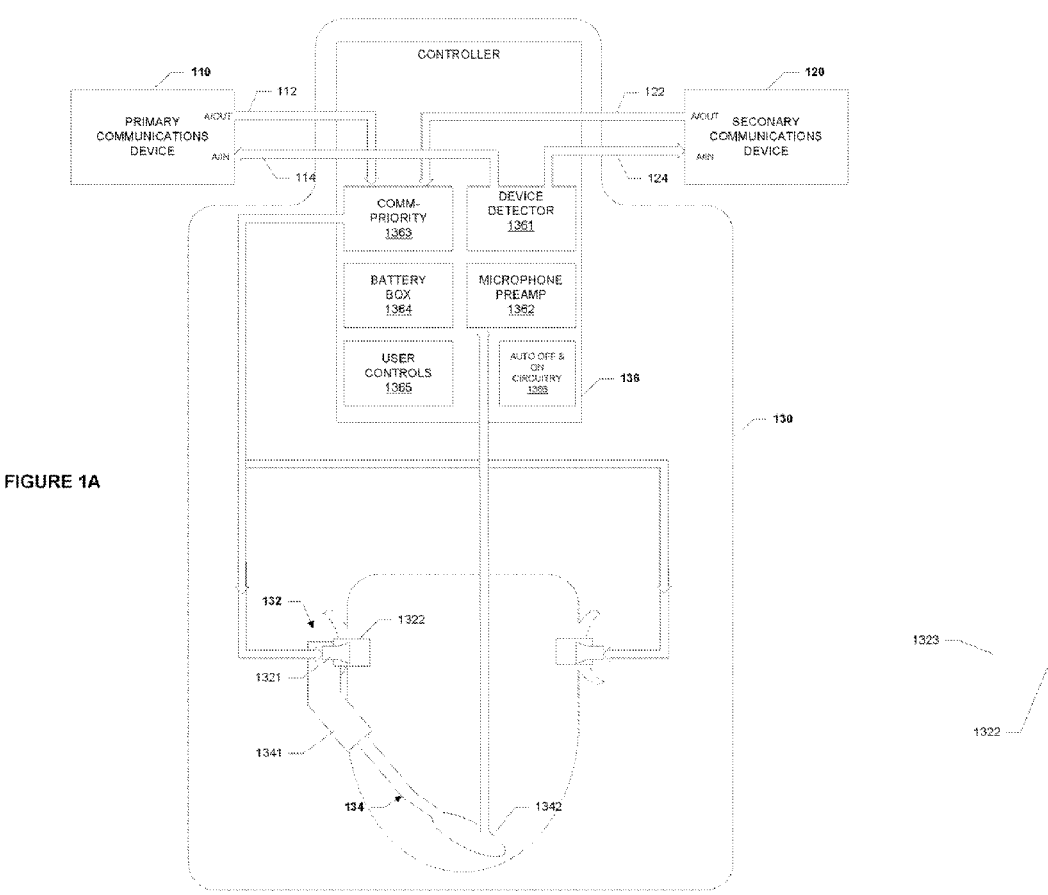
FIG. 1A is a block diagram of an exemplary system 100 corresponding to one or more embodiments of the present invention.
Figure 1B:
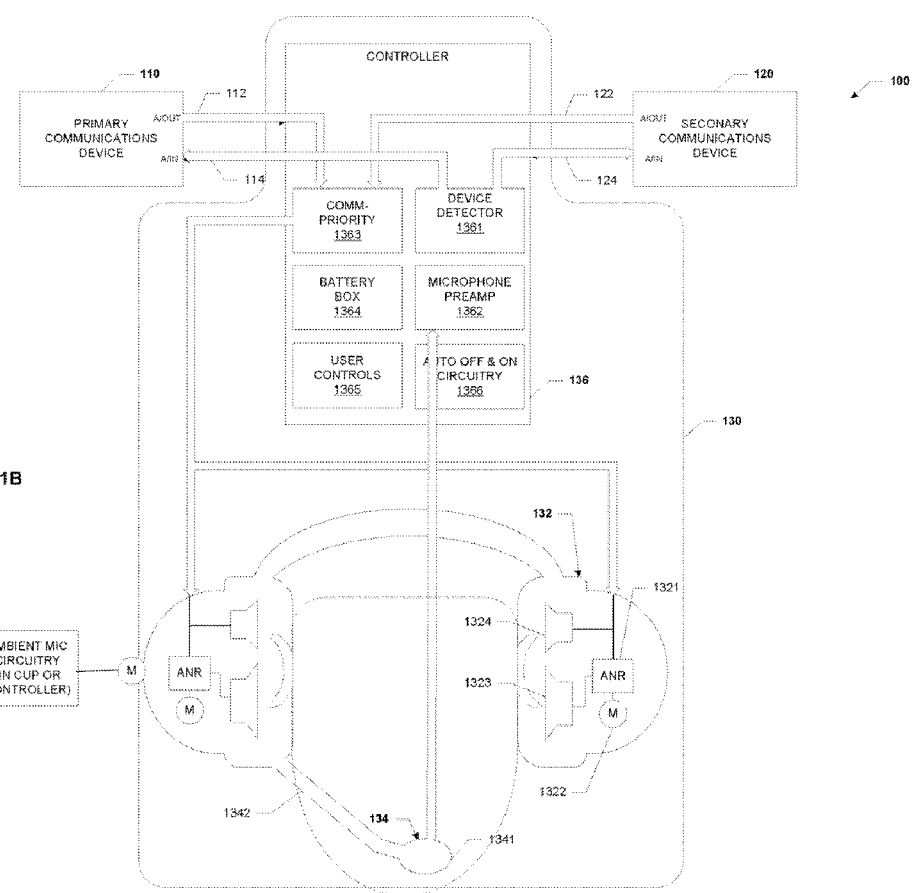
FIG. 1B is a block diagram of an exemplary system 100' corresponding to one or more embodiments of the present invention.

FIGS. 1A and 1B show exemplary systems 100 and 100' which incorporate teachings of the present invention. Specifically, system 100 includes a primary audio communication device 110, a secondary audio communications device 120, and an in-the-ear aviation headset 130. (Systems 100 and 100' are similar except as to the form of the earpieces and the inclusion of an ANR capability. However, some embodiments, of the in-the-ear headset may include an ANR capability. (Note that functionality described relative to one or the other is generally applicable to other, unless expressly noted otherwise.)

Primary communications device 110 includes, among other items not shown, a headphone output jack 112 and a microphone jack 114 coupled to internal circuitry not shown. In the exemplary embodiment, device 110 takes the form of a two-way aircraft radio, with headphone jack 112 being a 0.250-inch female stereo plug connector and microphone jack 114 being a 0.206-inch, female stereo plug connector. In some embodiments, device 110 includes a public-address or intercom capability.

Secondary communications device (or system) 120 includes, among other items (not shown), an audio output jack 122 and an external microphone jack 124. In the exemplary embodiment, communications device 120 takes the form of a cellular telephone, with output jack 122 and microphone jack 124 coupled to interface circuitry (not shown) which supports use of a conventional hands-free mobile-phone headset, which includes a microphone and an ear-piece (or headphones). (Hands-free headsets typically include an unbuffered electret microphone that is powered by interface circuitry (not shown) in the cell phone or other type secondary device. In the exemplary embodiment, this interface circuitry is not suitable for boom microphones in aviation headsets.) In some other embodiments, device 120 takes the form of a two-way radio, laptop computer, or other audio source or audio output device, such as a music or video player or other personal listening device. In still other embodiments, device 120 includes or is coupled to an input/output port of a larger multiport distribution network that distributes audio signals, for example, throughout an airliner.

Headset 130 includes, among other things, an earpiece 132, a boom microphone 134, and a controller 136. Earpiece 132, which is adapted to fit within a respective ear of a user (not shown) includes a moldable foam cover 1321 and an audio transducer or speaker 1322. However, in other embodiments, the earpiece takes the form of a circumaural (around-the-ear), superaural (on-the-ear), or behind-the-ear devices. In FIG.

1B, earpiece 132 includes ANR control circuitry 1323, an ANR microphone 1324, an ANR speaker 1325, a non-ANR speaker 1325.

Boom microphone assembly 134 includes an adjustable boom 1341 which extends from one of earpieces 132, and a microphone 1342 positioned at an end of the boom. Other embodiments use other forms of microphones. Earpiece 132 and boom microphone 134 are both coupled to controller 136.

Controller 136 includes secondary-device detector 1361, a boom microphone preamplifier 1362, a comm-priority module 1363, a battery box 1364, user controls 1365, and auto-off-and-on module 1366. In the exemplary embodiment, the controller is provided as a box or module separate from the earpieces; however, in some embodiments, all or one or portions of the controller are incorporated into one or more of the earpieces. For example, some embodiments place one or more of the controller input jacks directly on one of the earpieces. Also, one or more of these modules may be implemented in whole and/or in part using a programmable controller or processing unit, with the programming taking the form of a set of one or more instructions stored on a machine readable medium, such as an electronic, optical, or magnetic memory.

Secondary-device detector 1361 is coupled to microphone jack 124 of secondary communications device 120, microphone preamplifier 1362, and battery box 1364. Microphone preamplifier 1362, in the exemplary embodiment, is designed to operate using a 5-10 VDC voltage source and a 600-2000 ohm resistor. Comm-priority module 1363 is coupled to headphone jack 122 of primary communications device 110 and to audio output jack 122 of the secondary communication. Manual controls 1365 include on-off switch, left-right volume controls, stereo-mono switch, mode-programming switches, and bass and treble controls (all not shown separately.)

In general operation, secondary device detector 1361, which includes an audio input jack coupled to microphone jack 124 of secondary communications device 120, senses or detects connection or activation of device 120 to headset 130 and in response couples power derived from battery box 1364 to boom microphone preamplifier 1362. Comm-priority module 1363, which is coupled to the headphone jack of the primary communications device and to an audio output jack of the secondary communication, provides an automatic muting or attenuation function that reduces the volume or amplitude of an audio or electrical signal derived from the secondary communication device relative to the volume or amplitude of an audio or electrical signal derived from the primary communications device. Detector 1361 also senses decoupling or deactivation of device 120 and in turn decouples battery box 1264 from boom microphone preamplifier 1362.

Figure 2:
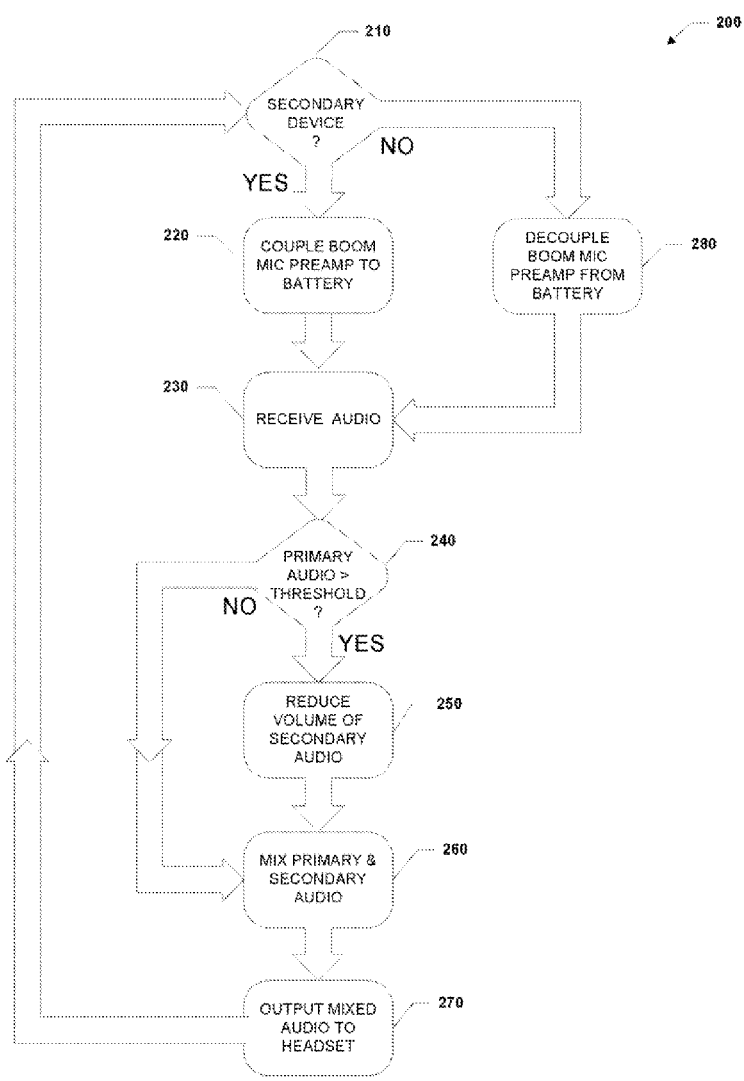
FIG. 2 is a flow chart of an exemplary method of operating a headphone or headset, which corresponds to one or more embodiments of the invention.

More particularly, FIG. 2 shows a flow chart 200 of one or more exemplary methods of operating system 100, particularly in relation to control module 136. Flow chart 200 includes process blocks 210-280, which are arranged and described serially for clarity. However, two or more of the blocks, in whole or in part, can be executed in parallel. Additionally, some embodiments may alter the process sequence by omitting or adding one or more blocks or provide different functional partitions to achieve analogous results. Moreover, still other embodiments implement one or more of the blocks using a processor or programmable logic device and an electronic, magnetic, or optical storage medium bearing machine-executable instructions for execution or facilitating execution of one or more portions of the exemplary method. Thus, the exemplary process flow applies to software, hardware, firmware, and other implementations beyond those exemplified here.

At block 210, exemplary execution begins with determining whether a secondary device, such as secondary communications device 120, is coupled to headset 130, or more precisely control module 136. In the exemplary embodiment, this entails using detector 1361 to detect or sense a preamplifier bias signal from secondary communications device 120. In some embodiments, the preamplifier bias signal is a 2.5 VDC signal, which is generally incompatible with the bias signal used in most aviation-grade ANR headsets. Other embodiments may use the state of a switch to determine connection of a second device. If the determination is that a secondary device is coupled to the headset, execution advances to block 220.

In block 220, detector 1361 couples power derived from battery box 1364 to microphone preamplifier 1362, thereby enabling the headset to self-power its boom microphone rather than relying on power from the primary communications device. This self-powering feature allows one to use the headset with the secondary communications device independent of any connection to the primary communications device. One benefit of this feature is that it allows the secondary device to be used in a noisy environment with no other electronics or power beyond the headset itself. Execution of the exemplary method continues at block 230.

Block 230 entails headset 130 receiving audio signals from one or the other or both of the primary and the secondary communications devices 110 and 120. In the exemplary embodiment, these audio signals are received at comm-priority module 1363 via headphone jack 112 and/or audio output 122. Execution then proceeds to block 240.

Block 240 entails determining whether to alter the relative amplitude of the primary and secondary audio signals. In the exemplary embodiment, this entails comparing the primary audio signal (more precisely the voltage at headphone jack 112) to a threshold voltage. If the comparison indicates that the primary audio signal is greater than the threshold voltage, execution advances to block 250; otherwise execution branches to block 260.

Block 250 entails altering the relative amplitude of the primary and secondary audio signals. In the exemplary embodiment, this alteration entails reducing the amplitude (or volume) of the secondary audio signal relative to that of the primary audio signal. Some embodiments may increase the amplitude or volume of the primary audio signal to be greater than that of secondary audio signal. Some embodiments may additionally output a notification signal, such as high-pitched tone or beep, to indicate presence of an primary audio signal in excess of the threshold.

Block 260 entails mixing the primary and secondary audio signals. In the exemplary embodiment, this mixing entails mixing the primary audio signal, or more precisely any voltage present on headphone jack 112 with the reduced or unreduced secondary audio signal.

Block 270 entails outputting the mixed primary and secondary audio signals to one or both of earpieces 132. In the exemplary embodiment, the mixed signals are output to speaker 1324 and to ANR circuitry 1321. Some embodiments, however, may omit or bypass the ANR circuitry. Execution then returns back to block 210.

Block 210 determines whether there is still a secondary device coupled to the headset. If the determination is that a device is still coupled to the headset, execution continues to block 220, as previously described. However, if the determination is that there is no secondary device (or that the secondary device has been deactivated, for example, as evidenced by failure to perceive a microphone bias voltage from the device), then execution advances to block 280, which entails decoupling of the headset battery from the boom microphone preamplifier to conserve battery power.

Figure 3:
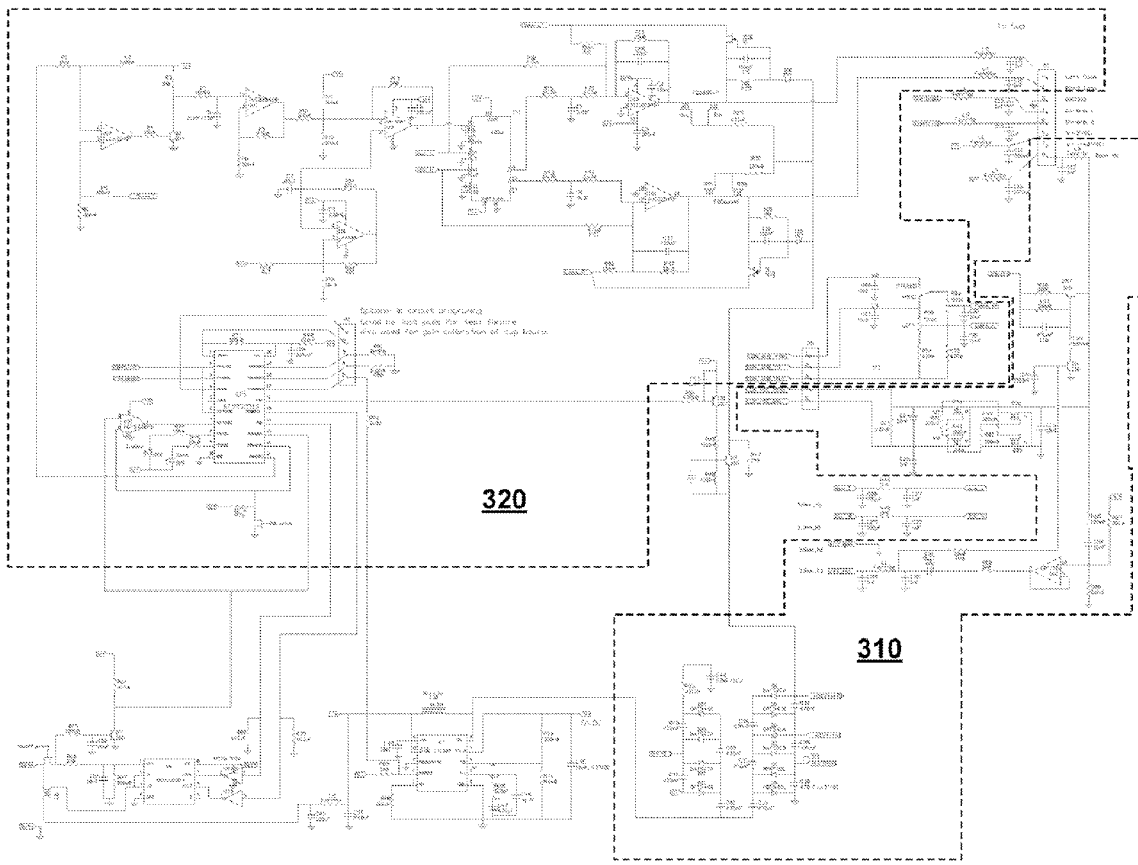
FIG. 3 is an electrical schematic of one or more exemplary circuits in system 100, each corresponding to one or more embodiments of the present invention.

FIG. 3 shows circuitry 300, which includes a detector circuit 310 that represents an exemplary implementation of secondary-device detector 1361 and a comm-priority circuit 320 that represents an exemplary implementation of comm-priority module 1363. In the figure, incoming signals from the secondary device are received at secondary inputs Aux_R and Aux_L, and incoming signals from the primary device are received at COM_AUD TIP and COM_AUD GND. Battery terminals (shown in the lower lefthand corner) are labeled Bat+ and Bat−.

Detector circuit 310 detects the presence of an external bias signal at an audio input jack (denoted cell_mic in the figure) via a transistor Q6, which turns on the current source comprising a transistor Q10. Activation of the current source provides a bias current for the boom microphone preamplifier. The current source has a compliance of over 10 VDC for undistorted communications at high-sound pressures. Notably, this implementation does not interfere with normal operation of the boom microphone preamplifier, if it is connected to a radio or intercom bias circuit because it is a current source realizing a high Thevinin equivalent impedance. Although not preferred, some embodiments may use a source with a low Thevinin equivalent impedance.

Comm-priority circuit 320 treats the Com_L input as the primary input to the headset and compares this signal to a threshold voltage via comparitor circuitry that includes operational amplifier U1B. If the signal at the Com_L input exceeds the trigger threshold (set by resistors R1 and R2, voltage V+, and processor output pin 11), then the output of operational amplifier U1B output goes high, saturating transistor Q8 and causing this transistor to rapidly discharge capacitor C1. In response to this discharge, operational amplifier U1C produces a low voltage at its output, which is coupled to a pulse-width-modulation (PWM) circuit comprising oscillator U4 and PWM comparitor U3.

In turn, the PWM circuit reduces the duty cycle of its output signal. This output signals controls analog switch U11 (4053), which is part of a chopping circuit, causing it to attenuate the auxiliary inputs Aux_L and Aux_R. U1a and U1d denote summing amplifiers that sum or mix the primary and secondary inputs, and also provide a reconstruction filter for the chopped signal. The output of summing amplifiers U1a and U1d are then passed up to the earpieces for transduction into acoustic signals.

When the primary audio input stops exceeding the trigger threshold, capacitor C1 slowly starts to charge up via resistor R3, thus increasing the duty cycle of the signal output from the PWM circuit and the gain level of the secondary audio input. The exemplary embodiment increases this gain linearly until it reaches its original level. (Non-linear restoration of the secondary signal is also feasible.) Microprocessor U5 is programmable via control inputs Control1 and Control2 to disable communications priority by setting processor output pin 11 to a high logic state and thereby moving the trigger threshold for initiating attenuation of the secondary input to a high value.

Other implementations could assign priority to the secondary inputs or allow the user to select which inputs have priority. The comm-priority functionality is selectable and controlled through microprocessor U5 using a combination of pushes of a button on a separate control module, such as module 136. Other embodiments place this control with controls on one or more of the earcups, the bridge between the earcups, or other convenient location.

In some embodiments, the functions and operations described above are modified in accord with one or more the following innovations.

Figure 4:
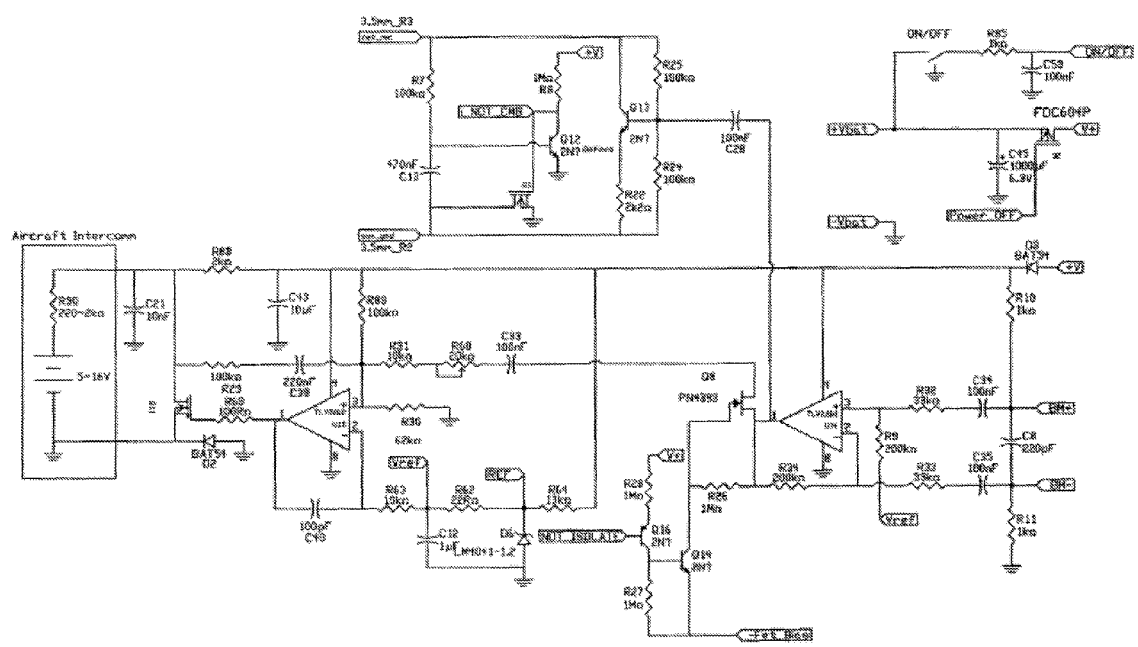
FIG. 4 is an electrical schematic of one or more exemplary circuits for systems 100 and/or 100', each corresponding to one or more embodiments of the present invention.
Figure 5:
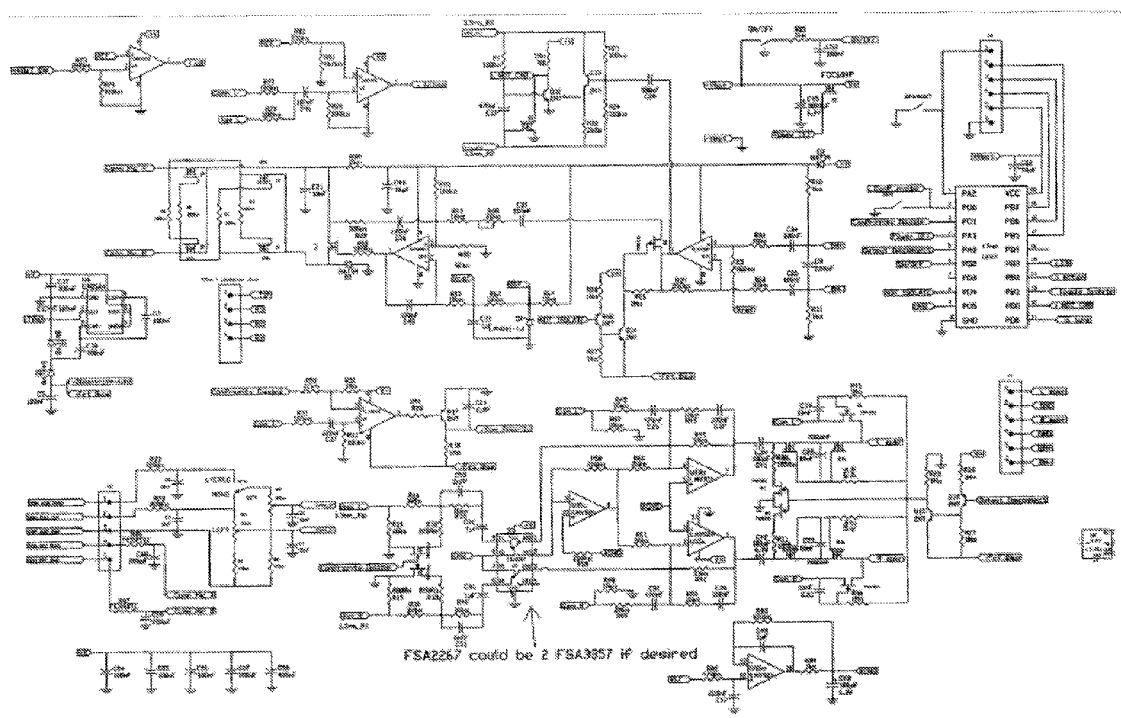
FIG. 5 is an electrical schematic of one or more exemplary circuits for systems 100 and/or 100', each corresponding to one or more embodiments of the present invention.
Figure 6:
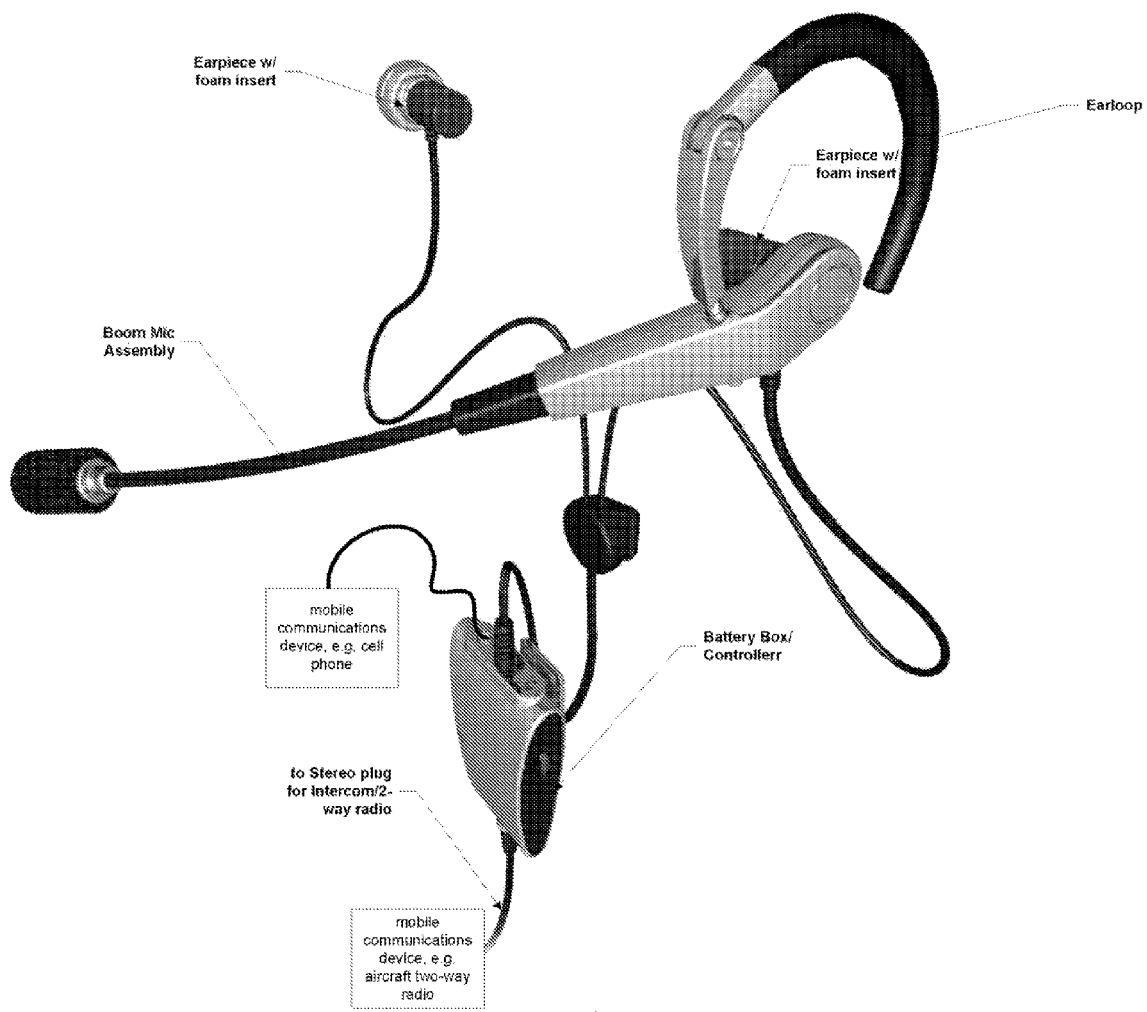
FIG. 6 is a perspective view of an exemplary in-the-ear headset corresponding to one or more embodiments of the present invention.

1. FIGS. 4 and 5 include show schematic of exemplary implementations of circuitry suitable or otherwise adaptable in whole or in part for headset 130 in systems 100 and 100'. This circuitry as described above incorporates "auxiliary music or cell phone" technology, as also described in co-pending patent application Ser. No. 10/624,906 which was filed on Jul. 22, 2003 and which is incorporated herein by reference. This technology optionally mutes down the auxiliary music or cell phone signal when a corn input is detected, and slowly bring it back up when the corn input subsides. It will work with a cell phone when the headset is plugged into an intercom or radio with mic bias, and even when not, in which case the headset battery (or more generally headset power supply) will power the boom mic preamp.

There is a difference though. In FIG. 3 and the referenced patent application, the boom mic preamp is powered by the headset batteries, and the mic preamp output is "buffered" and sent out to the cell phone. The "shunt type mic preamp is power hungry. In this implementation, the output for the cell mic is pulled out "half way" through the boom mic preamp (U14), rather than from the "shunt regulator amp" Q11 drain. This is much more efficient, since the supply doesn't need to provide all the shunted current of Ql5A. (Another level of power savings is to shut off the current to U13 when only the cell mic portion is required, and further, shutting down the entire mic preamp U13 and U14, when the mic is not required.) This implementation requires ~100 uA versus several to tens of milliamps from the battery. In the in-the-ear implementation, this savings is particularly significant.

2. Also, the new preamp U14 uses what might be a novel circuit for providing the "shunt amp" function that all aircraft intercoms work with. ("Shunt amp" may not be correct terminology.) The circuit uses op amp U13 and reference D6 (1.2V) to provide both a closed loop "AC" feedback voltage amplifier signal for the output of Q15A (and the plane radio), and provide a regulated voltage for the mic bias circuitry of (1+R89/R30)*1.2V, or in this case (100 k/62 k+1) *1.2V=3.13V. This provides a very precise regulated supply.

3. Note: in this implementation diode D3 prevents the mic bias supply from powering the rest of the circuitry and from charging the battery. If D3 is removed, then the whole circuit can be powered. The concept of powering the circuitry partially from the mic bias and handling transients power demands with a battery, such as a primary, non-rechargeable type, or perhaps a rechargeable battery or super cap. The advantage in the battery supplement is that the range of intercom and radio mic bias circuitry is quite large, like from 5~16V and 220~2 kohms. Thus if a headset is plugged into a 12V 220 Rohm source, it will never require the battery, but if it is plugged into a 5V 2 k battery powered intercom, then it will function at or near the same performance level. Thus, a headset having this battery plus intercom power capability is practically universally adaptable.

4. Another novelty in this implementation is the cell-phone isolate function, which allows a user to isolate himself from the intercom/passengers when using the phone in combination with the headset. More specifically, if the headset is plugged into an intercom, and a cell phone, pushing the "isolate" button on the battery box will turn off Q8 and thus block the cell mic signal from reaching the intercom. The microprocessor or microcontroller controls this via Q14 and Q16 which do a level translation. (Q8 is a depletion type FET, so that when no gate-to-source voltage is present, it is ON. It needn't be, but it is convenient because mosfets have a body diode, and Jfets do not, thus you only need one, versus two mosfets.) (Some embodiments may reverse the logic of this function so that the cell mic signal is by default blocked from the intercom and pushing the de-isolate (or conference) button allows the cell mic signal to reach the intercom.) Some embodiments automatically exit the isolate state or mode when no cell phone mic bias is present.

Another feature of some embodiments is built-in side tone when using a cell phone. This will engage if the isolate function is enabled, since normally, the plane intercom will provide side tone. When the headset is used by itself, independent of an intercom, the "isolate" button function will have a different function: it will turn on and off side tone.

5. Another feature of some embodiments is cell phone sidetone. Under normal situations an aircraft intercom has side tone; however, most if not all cell phones lack side tone. The delays are to significant for loop back to use the same system wired POTS that landline phones use. The feature is automatic side tone that kicks on when used with a cell phone and no intercom side tone is available, and/or the feature of local side tone being integrated when the isolate function is enabled. This is why the periodic beeping is so important, as with the loss of side tone, it would be obvious that you were not connected to the intercom.

(Some embodiments might isolate the incoming signal from the radio/intercom; this could be dangerous for a pilot, but it would be potentially a nice feature for passengers.)

Another reason to have side tone in cell phone mode is that this will be a great headset for high noise environments. It uses a noise canceling mic, and the sidetone feedback to the user will facilitate mic placement.

6. Some embodiments produce a repeating warning tone or click in the earcup or from the earpiece when radio/intercom mic bias is present, a cell mic is connected, and the isolate function is ON or enabled. In this situation, a user may not realize or forget the isolate function is enabled, and get into a dangerous situation because of it. A periodic tone burst (Beep- - -beep- - -beep, or repeating click in this situation would reminder the user of the isolate condition. Variations of this embodiment may trigger one or more blinking LEDs to remind the user of the isolation. The LEDs may in some instances be integrated into the housing of the stereo plug for the cell phone mic jack, on the headset mic, on the battery box, or on a cable. Beep or flash frequency might be once every 10, 15, 20, or 30 seconds.

7. The mic circuit connecting to the electret element is also balanced in this implementation. This is valuable because the mic is several feet from the preamp, and the balanced or differential configuration improves RF immunity significantly. The preamp made with U14 is a differential input, thus any common mode noise on the mic wires connected to +BM and −BM is not amplified.

8. Auto-off implementation. In FIG. 5, the comparator U5 looks for any incoming signals. If any signal (from the left side of the intercom or radio, or the aux input) is detected, then the active circuitry within headset (headphone) will stay on for 15 minutes. Conversely, a loss of both of these signals will result in a shutdown. The headset will function as an ordinary headset at this point, that is without the auxiliary input features. (This may be considered a passive mode.) The circuitry looks for some incoming audio, being from the aircraft intercom, radio, aux music input, or cell phone bias, and stays "ON" if any "action" (that is sufficient signal level) is detected on these lines. If no action is detected for 15 minutes, we shut down. Other embodiments may use other time periods as desired.

To save microprocessor (uP) overhead, some embodiments only start to even look after a period of time, such as 1 minute, This helps a bit on power conservation, since if you're listening to music, the uP is constantly needing to reset its timer via an interrupt.

9. Auto ON. If mic bias is on, or any input signal breaks a low threshold, a ultra low power comparator will wake the device up. There are comparators available that run on under 1 uA, referred to by some manufacture as "nano-power". Output from such a comparator could be coupled to a wake up circuit or pin on the microprocessor. See, for example, U.S. Pat. No. 6,704,428, which is incorporated herein by reference.

10. Powering the whole circuit from the mic bias, as previously discussed, with a battery being the back up. Possibly having the battery is a rechargeable LION type, which have excellent retention and charge efficiency.

11. Using "class D" technology to replace the shunting affect of Q11 with inductor and "ON/OFF" switch that would modulate its duty cycle to both produce the desired "AC" amplifier AND efficiently transfer the energy that would normally be wasted as heat in Q11.

12. Filtered "ambient" microphone placed on headset, e.g., earcup, earpiece, or on a cable, to pick up cockpit conversations that are not on an intercom. Some embodiments provide a volume control for the signal from this microphone on the battery box, on the earpiece of the in-the-ear (e.g. the non-boom-side earpiece), or on a cable.

Some embodiments use a linear gain block amplifying the filtered ambient signal from the microphone. Others use compressor expander type processing that increases volume quickly if there is speech detected, then slowly back the volume off after speech has passed. Still others compress all the ambient sound from the mic, so as never to present a loud sound, even if it was transient.

This ambient microphone, as well as other features described herein, can serve professional pilots of jet airliners as well as non-ANR headsets. They need to always be connected to the tower, yet they don't have the intercom function that General Aviation (GA) pilots have. Because of this, they often fly with one in-the-ear device in one ear, and the other unprotected so they can chat with the other crew members. Thus, what they need is a two-ear in-the-ear headset, like the one shown herein, but with an "ambient mic" located on the non-boom mic side. This feature will allow the user to "dial in" the amount of ambient sound he needs to hear the crew chat, yet still protect his hearing.

Other related functions include compressing the ambient sound, so the user will never hear a loud transient. Also, there could also be a music input, which is muted when tower communications came in, and when "ambient sound" broke a threshold.

Some embodiments gate off the ambient sound if it was steady state, e.g., the whoosh of 500 mph wind noise, and only allow pass ambient when there was "speech range" changes.

The "ambient" mic feature could save a lives of joggers who get too "tuned out" of the world. The ambient mic feature can also be incorporated in other general consumer or hi-fi headsets and headphones, with or without ANR capability. This feature might also allow the use of two-ear isolation for cell phones since it would allow the hearing of ambient sounds, like sirens and tire squeals.

13. Another feature is the ability to actively test the battery condition and receive an audible pulse of tones in an earpiece or from the battery box to indicate the battery state. This could be 1-5 pulse tones, or perhaps a dual tone: Beeee Beeeee, for good; and Beeee booop, for bad.

The exemplary "active battery test" occurs on request. In some embodiments, the test is triggered when the isolate button on the battery box is depressed for several seconds, and no cell phone is connected. The test will entail loading the battery down to get a good measure of the battery condition.

14. Another feature is the way the cell phone mic circuit is done. It is driven with an "electronically simulated transformer", thus avoiding compatibility issues between 3 and 4 conductor headset plugs on phones.

CONCLUSION

The embodiments described above are intended only to illustrate and teach one or more ways of practicing or implementing the present invention, not to restrict its breadth or scope. The actual scope of the invention, which encompasses all ways of practicing or implementing the concepts of the invention, is defined by the following claims and their equivalents.

What is claimed is:

1. An in-the-ear headset comprising:
    first and second in-the-ear audio transducers for insertion into corresponding ears of a user;
    a boom microphone in generally fixed relation to:
    to at least one of the transducers;
    first and second audio inputs for receiving first and second audio signals from respective first and second communications devices;
    means for mixing and selectively attenuating one of the first and second audio signals from the first and second communications devices and providing audio signals to the first and second transducers; and
    means for selectively isolating the first audio signal from the second communications device.

2. The in-the-ear headset of claim 1, further comprising:
    a preamplifier circuit coupled to receive signals from the first input; and
    means, responsive to the first and second audio inputs, for deactivating or activating the preamplifier circuit.

3. The in-the-ear headset of claim 1, wherein the controller further includes:
    a battery terminal; and
    means for selectively coupling the preamplifier circuit to be powered via the first or the second communication device or via the battery terminal.

4. The in-the-ear headset of claim 3, wherein the means for selectively coupling the preamplifier is configured to selectively power the preamplifier circuit via one of the first and second communication devices and the battery terminal.

5. The in-the-ear headset of claim 1:
    wherein the first communication device is an aircraft intercom; and
    wherein the headset further comprises at least one battery and a circuit for selectively combining power from the battery and power from the aircraft intercom to power the headset.

6. The in-the-ear headset of claim 1, wherein the first communications device is an aircraft intercom and the second device is a mobile telephone.

7. The in-the-ear headset of claim 1, further comprising:
    means, responsive to a perceived absence of the first and second audio signals for a predetermined amount of time, for deactivating circuitry coupled to the audio transducer at least one of the first and second audio transducers.

8. The in-the-ear headset of claim 7, wherein the predetermined amount of time is 15 minutes.

9. An in-the-ear headset comprising:
    first and second in-the-ear audio transducers for insertion into corresponding ears of a user;
    a boom microphone in generally fixed relation to at least one of the transducers;
    first and second audio inputs for receiving first and second audio signals from respective first and second communications devices, with the first communications device including an aircraft intercom and the second communications device including a mobile telephone; and
    circuitry for selectively isolating the second audio signals from the first communications device.

10. The in-the-ear headset of claim 9, further comprising: means for mixing and selectively attenuating one of the first and second audio signals from the first and second communications devices and providing audio signals to the first and second transducers;

* * * * *

UNITED STATES PATENT AND TRADEMARK OFFICE
CERTIFICATE OF CORRECTION

PATENT NO. : 7,668,308 B1  Page 1 of 1
APPLICATION NO. : 11/458670
DATED : February 23, 2010
INVENTOR(S) : Michael J. Wurtz It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 487 days.

Signed and Sealed this

Twenty-eighth Day of December, 2010

David J. Kappos
*Director of the United States Patent and Trademark Office*